United States Patent
Jung et al.

(10) Patent No.: US 8,138,414 B2
(45) Date of Patent: Mar. 20, 2012

(54) SURFACE-MODIFIED SEMICONDUCTOR ELECTRODE, DYE-SENSITIZED SOLAR CELL, METHOD OF MANUFACTURING THE SOLAR CELL, AND POLYMER COMPOSITION USED FOR THE METHOD

(75) Inventors: Won-cheol Jung, Seoul (KR); Sang-cheol Park, Seoul (KR); Young-jun Park, Suwon-si (KR); Jung-gyu Nam, Yongin-si (KR)

(73) Assignees: Samsung SDI Co., Ltd., Yongin-si (KR); Samsung Electronics Co., Ltd., Suwon-si (KR)

( * ) Notice: Subject to any disclaimer, the term of this patent is extended or adjusted under 35 U.S.C. 154(b) by 896 days.

(21) Appl. No.: 11/334,360

(22) Filed: Jan. 19, 2006

(65) Prior Publication Data
US 2006/0157104 A1      Jul. 20, 2006

(30) Foreign Application Priority Data
Jan. 20, 2005    (KR) .................. 10-2005-0005534

(51) Int. Cl.
*H01L 31/00*    (2006.01)
(52) U.S. Cl. ......... 136/256; 136/243; 136/263; 136/264
(58) Field of Classification Search ............ 136/256, 136/243, 263, 264
See application file for complete search history.

(56) References Cited

U.S. PATENT DOCUMENTS

| | | | |
|---|---|---|---|
| 4,927,721 A | | 5/1990 | Gratzel et al. |
| 5,350,644 A | * | 9/1994 | Graetzel et al. ............... 429/111 |
| 5,728,431 A | | 3/1998 | Bergbreiter et al. |
| 2003/0062082 A1 | * | 4/2003 | Miteva et al. ................ 136/263 |

FOREIGN PATENT DOCUMENTS

| | | |
|---|---|---|
| KR | 10-2001-0111379 | 12/2001 |
| KR | 1020020069796 A | 9/2002 |
| KR | 10-2003-0073420 | 9/2003 |

OTHER PUBLICATIONS

By Kevin Coakley et al, "Infiltratin Semiconducting Polymers into self-Assembled Mesoporous Titania films for photovoltaic applications", Adv. Funct. Mater. 2003, 13, No. 4 April.*
Kovtyukhova et al "Self-assembly of ultrathin composite TiO2/polymer films", Thin Solid Films, 337 (1999) p. 166-171.*
Jose L.C. Fonseca et al., Plasma Polymerization of Hexamethyldisilane onto Polyethylene Film, Macromolecules 1992, pp. 4730-4733, vol. 25. Jessica Kruger et al., Modification of $TiO_2$ Heterojunctions with Benzoic Acid Derivatives in Hybrid Molecular Solid-State Devices, Adv. Mater. 2000, pp. 447-451, vol. 12, No. 6.
A. Vittadini et al., Formic Acid Adsorption of Dry and Hydrated $TiO_2$ Anatase (101) Surfaces by DFT Calculations, J. Phys. Chem. B 2000. pp. 1300-1306, vol. 104.
Korean Office Action with English Translation for Application No. 10-2005-0005534 dated Apr. 19, 2011.

* cited by examiner

*Primary Examiner* — Jeffrey T Barton
*Assistant Examiner* — Xiuyu Tai
(74) *Attorney, Agent, or Firm* — Christie, Parker & Hale, LLP (57) ABSTRACT

Provided is a semiconductor anode including: a metal oxide semiconductor formed on a conductive substrate; a dye formed on a surface of the metal oxide semiconductor; and a polymer self-assembled on a surface of the metal oxide semiconductor. Provided are also a dye-sensitized solar cell, a method of manufacturing the dye-sensitized solar cell, and a polymer composition used for the method of manufacturing the dye-sensitized solar cell. The dye-sensitized solar cell includes an organic material-incorporated metal oxide semiconductor. Therefore, the transfer of electrons in the semiconductor to an electrolyte can be prevented, thereby increasing photocurrent and photovoltage, resulting in enhancement in energy conversion efficiency.

5 Claims, 5 Drawing Sheets

SURFACE-MODIFIED SEMICONDUCTOR ELECTRODE, DYE-SENSITIZED SOLAR CELL, METHOD OF MANUFACTURING THE SOLAR CELL, AND POLYMER COMPOSITION USED FOR THE METHOD

CROSS-REFERENCE TO RELATED PATENT APPLICATION

Priority is claimed to Korean Patent Application No. 10-2005-0005534, filed on Jan. 20, 2005, in the Korean Intellectual Property Office, the disclosure of which is incorporated herein in its entirety by reference.

FIELD OF THE INVENTION

The present invention relates to a dye-sensitized solar cell, and more particularly, to a dye-sensitized solar cell including a surface-modified metal oxide semiconductor that exhibits excellent energy conversion efficiency, and a method of manufacturing the same.

DESCRIPTION OF THE RELATED ART

Amorphous silicon solar cells are representative of currently available solar cells. The amorphous silicon solar cells were commercially available long ago. Due to their high energy conversion efficiency they have been most widely used. However, high purity silicon is required for operating the silicon solar cells, which restricts commercial application of the silicon solar cells. Thus, various attempts to develop high-efficiency solar cells having new constructions using new materials as alternatives to the silicon solar cells have been made.

Schottky junction characteristics between a semiconductor and a metal can also be applied between a semiconductor and an electrolyte. However, when an electrolyte is applied to a semiconductor having a small energy difference between a valence band and a conduction band such as silicon, gallium-arsenic, etc., there arises a problem that carriers excited by light decompose the semiconductor.

On the other hand, in the case of using a metal oxide semiconductor which is stable to light due to its high energy difference between a valence band and a conduction band, the above-described semiconductor decomposition problem is not caused. However, there is a problem in that energy conversion efficiency for light, in particular solar light is very low.

In this regard, an attempt was made to add a dye acting as a photosensitizer to an oxide semiconductor so that light absorption occurs in the dye and charge carrier separation occurs at an interface of the dye and the oxide semiconductor, thereby increasing photosensitivity. In this case, however, cell efficiency was still only 0.1 to 0.2%.

A Gratzel cell was reported in U.S. Pat. No. 4,927,721 to Gratzel et al., which was a major turning point for dye-sensitized solar cells. The Gratzel cell has a remarkably increased surface area by modifying a surface of a common metal oxide semiconductor into a very rough and porous surface, and has cell efficiency comparable to monocrystalline silicon by utilizing light reflected or scattered from the surface. Since then, a dye-sensitized solar cell has been regarded as a powerful alternative to a silicon cell and thus many attempts to more efficiently enhance cell efficiency have been made.

The energy conversion efficiency of a solar cell is determined by multiplication of photocurrent and photovoltage of the solar cell and a fill factor. Thus, to enhance the energy conversion efficiency of a solar cell, it is necessary to increase the above parameter values. The photocurrent of the solar cell is generated by diffusion of electrons injected into a metal oxide semiconductor and the photovoltage of the solar cell is determined by difference between the Fermi level (EF) of the metal oxide semiconductor and the oxidation-reduction potential of an electrolyte. To increase photocurrent, a method of increasing the electron density of a metal oxide semiconductor by minimizing recombination through surface modification of the metal oxide semiconductor may be considered. To increase photovoltage, a method of shifting the conduction band energy level of metal oxide to a negative value with respect to a standard hydrogen electrode potential, a method of shifting the oxidation-reduction potential of an electrolyte to a positive value with respect to a standard hydrogen electrode potential, etc. may be considered.

However, when light is incident on a surface of a metal oxide semiconductor, the Fermi level of the metal oxide semiconductor is increased by electron injection. When light is not incident on a surface of a metal oxide semiconductor, only dark current is generated. Thus, the Fermi level of a metal oxide semiconductor is parallel to the oxidation-reduction level of a solution. In this respect, photovoltage enhancement methods are not strictly discriminated from photocurrent enhancement methods.

Most studies done hitherto for efficiency enhancement of dye-sensitized solar cells are directed to increase an area of a surface of a metal oxide semiconductor contacting with light by roughening the surface of the metal oxide semiconductor. For example, cell efficiency can be enhanced by adsorbing dyes as many as possible onto a rough and porous surface of a semiconductor manufactured by sintering a mixture of nanoparticles and a binder. Conventional techniques related thereto are described below.

U.S. Pat. No. 5,728,431 discloses an oxide semiconductor electrode manufactured requiring no sintering process. According to the disclosure in the patent document, metal oxide microparticles and a binder are dissolved in a solvent and coated on a substrate using a sprayer, followed by solvent evaporation. By doing so, restriction of substrate selection and thus high manufacturing costs that are involved in a sintering process can be solved, and the semiconductor electrode has a sufficient strength.

Korean Patent Laid-Open Publication No. 2001-0111379 discloses a solar cell using rutile titanium dioxide nanoparticles instead of common anatase titanium dioxide nanoparticles. The solar cell is characterized by the use of a rutile titanium oxide considered as an inappropriate cell material, but the energy conversion efficiency of the cell is not so high by 5.6%.

Korean Patent Laid-Open Publication No. 2003-0073420 discloses a solar cell with enhanced cell efficiency relative to a common titanium dioxide solar cell by preparing titanium dioxide nanoparticles using acetated or halogenated substance containing univalent or bivalent cations. According to this patent document, the enhancement in the energy conversion efficiency of the solar cell is accomplished through surface modification of an oxide semiconductor with ions.

As described above, the conventional techniques have been focused on increasing electron production by varying an oxide semiconductor electrode formation method, but are silent about electron loss due to migration of electrons injected into an oxide semiconductor to an electrolyte. That is, electrons injected from a dye into a semiconductor are not fully migrated to the electrode but are partially migrated to an electrolyte and to a dye. Therefore, a considerable amount of electrons injected into the semiconductor are wasted without being utilized as current, thereby leading to reduction in cell efficiency.

Meanwhile, self-assembly is a modification of a surface such as metal using an organic substance. The self-assembly has been widely used due to easy application and high uniformity. In particular, since self-assembly can form a well-defined monolayer, is thermally stable, and can be controlled at a molecular level, studies about the self-assembly have been actively done (Macromolecules 1992, 25, 4730). The self-assembly was originally mainly used in the electrochemistry field to manufacture a modified electrode but has been currently applied in various fields.

Self-assembly of benzoic acid as a monolayer on a titanium dioxide surface was reported in the dye-sensitized solar cell field (Adv. Mater. 2000, 12, No. 6). However, the benzoic acid monolayer is formed between a dye used as a p-type semiconductor and a titanium dioxide layer used as an n-type semiconductor to evaluate an effect of the monolayer on a pn-junction semiconductor, and thus, a dye-sensitized solar cell using the benzoic acid monolayer is distinguished from a common dye-sensitized solar cell using an electrolyte in terms of construction.

Meanwhile, there was reported a self-assembly of formic acid on anatase titanium dioxide to form stable coordination (J. Phy. Chem. B 2000, 104, 1300). However, this is only a theoretical simulation study.

U.S. Pat. No. 5,728,431 discloses a method of self-assembling a reactive group-containing polymer on a metal or metal oxide surface. This patent is distinguished from other conventional techniques in that a reactive group-containing polymer is self-assembled on a metal or metal oxide surface. However, this technique is also a simple self-assembly of a polymer on a metal or metal oxide surface.

Therefore, it is necessary to develop a substantial method of reducing unwanted electron loss by modifying a metal oxide semiconductor of a dye-sensitized solar cell through self-assembly.

SUMMARY OF THE DISCLOSURE

The present disclosure provides a semiconductor anode with a surface-modified metal oxide semiconductor.

The present disclosure also provides a dye-sensitized solar cell with enhanced energy conversion efficiency.

The present disclosure also provides a method of manufacturing a dye-sensitized solar cell.

The present disclosure also provides a polymer composition capable of modifying a surface of a metal oxide semiconductor.

According to an aspect of the present disclosure, there is provided a semiconductor anode including: a metal oxide semiconductor formed on a conductive substrate; a dye formed on a surface of the metal oxide semiconductor; and a polymer self-assembled on a surface of the metal oxide semiconductor.

According to another aspect of the present disclosure, there is provided a dye-sensitized solar cell including: a semiconductor anode; an electrolyte solution layer formed on a lower portion of the semiconductor anode; and an opposite electrode formed on a lower portion of the electrolyte solution layer.

According to still another aspect of the present disclosure, there is provided a method of manufacturing a dye-sensitized solar cell, the method including: contacting a metal oxide semiconductor formed on a conductive substrate to a dye solution or dispersion; and contacting the dye-adsorbed semiconductor to a polymer solution or dispersion.

According to yet another aspect of the present disclosure, there is provided a polymer composition that can be coated on a surface of a metal oxide semiconductor of a dye-sensitized solar cell.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS

The present invention will now be described more fully with reference to the accompanying drawings, in which exemplary embodiments of the invention are shown.

As used herein, the term "polymer" is intended to embrace all compounds in which two or more molecules of a monomer are combined. Thus, throughout the specification, the term "polymer" comprehends all polymers except a specific compound monomer, including dimers and trimers.

A semiconductor anode of the present disclosure includes a metal oxide semiconductor formed on a conductive substrate, a dye formed on a surface of the metal oxide semiconductor, and a polymer self-assembled on another surface of the metal oxide semiconductor.

In the present disclosure, in order to prevent a reduction in cell efficiency due to migration of electrons generated in a dye to a semiconductor via a dye/semiconductor interface and then migration of the electrons in the semiconductor to an electrolyte, an attempt to block a passage for the migration of the electrons in the semiconductor to the electrolyte was made.

In a dye-sensitized solar cell, migration of electrons in a semiconductor to an electrolyte occurs at a direct contact area between the semiconductor and the electrolyte, i.e., at a dye-free surface of the semiconductor. Thus, to prevent the migration of the electrons in the semiconductor to the electrolyte, a method of coating a material having relatively low electroconductivity on the dye-free surface of the semiconductor can be considered. However, a method of coating a material having relatively low electroconductivity on a dye-free surface of a semiconductor without inhibiting the action of a dye is substantially restricted. Thus, it is necessary to selectively attach a predetermined material onto a dye-free surface of a semiconductor.

For this, in the present disclosure, a self-assemblable polymer is self-assembled on a surface of a semiconductor. The self-assemblable polymer is selectively bound to a dye-free surface of the semiconductor. Therefore, as described above, the migration of electrons to an electrolyte can be efficiently prevented without adversely affecting the action of a dye.

Through the self-assembly of a polymer, a very thin film having an aligned molecule array is formed on a surface of an oxide semiconductor. The self-assembly forms a chemical bond between the surface of the oxide semiconductor and the polymer, and thus provides a solid and stable film that cannot be obtained by any other methods such as spin coating, casting, and Langmuir-Blodgeft film formation. According to the present disclosure, a functional group of the polymer and a surface end functional group or metal of the oxide semiconductor are covalently bound, unlike other conventional methods in which a polymer and an oxide semiconductor are not chemically bound but simply physically adsorbed.

Figure 1:
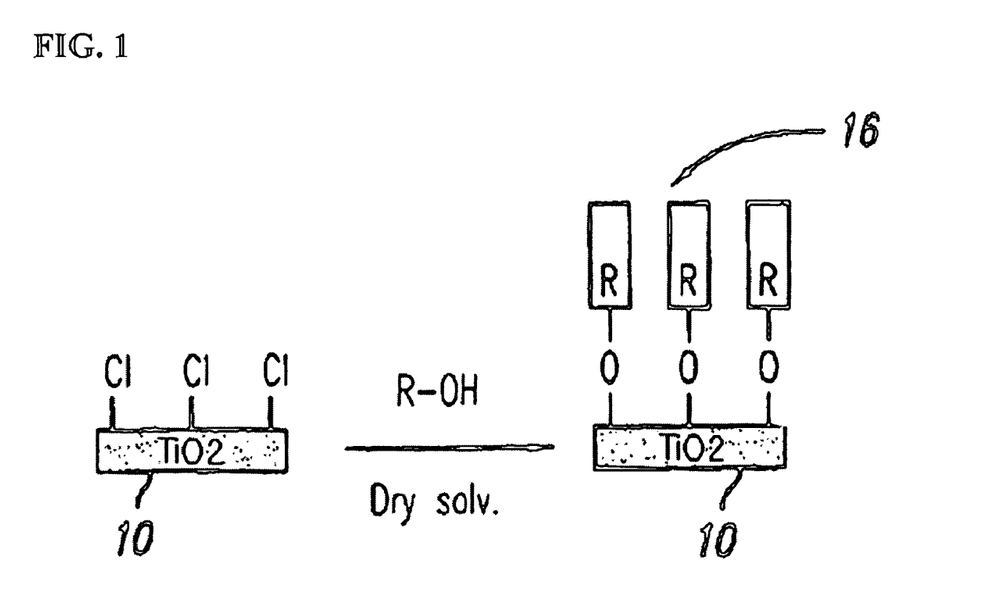
FIG. 1 is a schematic view illustrating an example of self-assembly of molecules on a $TiO_2$ surface.
Figure 2:
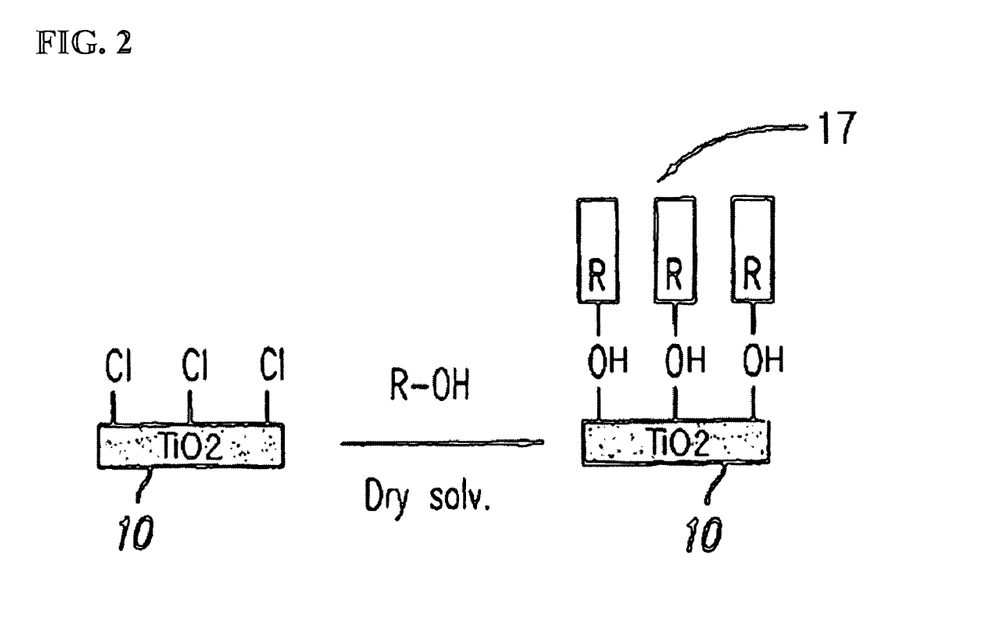
FIG. 2 is a schematic view illustrating another example of self-assembly of molecules on a $TiO_2$ surface.

FIGS. 1 and 2 illustrate examples of the self-assembly of a molecule on a surface of $TiO_2$ oxide. However, the self-assembly is not limited to the above-illustrated examples and various methods may be used. Referring to FIGS. 1 and 2, an oxide semiconductor 10 is treated with hydrochloric acid, etc., so that chlorine is present on a surface of the oxide semiconductor 10, and is then contacted to a functional group-containing molecule to thereby form a molecule layer chemically bound to the surface of the oxide semiconductor 10. The molecule layer may be a molecule layer 16 having a substituted functional group by a surface reaction or a molecule layer 17 holding an intrinsic chemical structure of the molecule.

To selectively attach a polymer onto a surface of a semiconductor in a self-assembled manner, it is preferable that the polymer has at least one self-assemblable functional group. Examples of the self-assemblable functional group include —OH, —SH, —COOH, —$CONH_2$, —OCOR, —$OCOCF_3$, —SCOR, —$CH_2SH$, —$CH_2SCN$, —$SH_2SCOCH_3$, —COOR, —$Si(OMe)_3$, —$Si(OEt)_3$, —$SiCl_3$, —COCH=$CH_2$, —OCOCH=$CH_2$, and —CH=$CH_2$.

With respect to a metal complex constituting a dye, reactive functional groups are adsorbed to a surface of an oxide semiconductor or coordinated to a central metal. Therefore, a metal complex constituting a dye cannot be chemically bound to a functional group of a self-assemblage polymer but can be physically adsorbed thereto via a Van der Waals force. The physical adsorption can be easily removed by cleaning with a solvent, etc.

Meanwhile, the chemical bond of a polymer with a surface of an oxide semiconductor can be relatively easily performed by means of a functional group formed on the surface of the oxide semiconductor by a pretreatment, a functional group originally present on the surface of the oxide semiconductor, or reactivity of a metal atom. Thus, the polymer can be preferentially bound to a surface of the oxide semiconductor on which no dyes are formed, resulting in selective binding of the polymer with the surface of the oxide semiconductor. Even when a dye may be partially overlapped with a polymer, the overlapping of the dye with the polymer is mediated by weak physical adsorption and thus can be removed by cleaning with a solvent.

By doing so, a dye is in contact with an electrolyte and an oxide semiconductor is coated with a polymer film. As a result, a contact between the oxide semiconductor and the electrolyte is prevented. Therefore, electron loss due to migration of electrons in a semiconductor into an electrolyte is solved, electron concentration injected into an electrode increases, and the Fermi level of the semiconductor increases, thereby increasing cell efficiency.

A thus-formed self-assembled polymer film is very stable even in an acidic solution condition, in addition to in cleaning with a solvent, an ultrasonic treatment, etc.

The self-assembled polymer film can be identified by observing surface atomic arrangements through scanning tunneling microscopy (STM) or atomic force microscopy (AFM), by functional group identification through IR spectrum, by determining surface hydrophobicity through contact angle measurement, by identifying an electron transport blocking layer through cyclic voltammetry, etc. These techniques are well known in the art and can be applied to the present disclosure in the same way. Dye and polymer formation according to the present disclosure is provided in detail in IR spectra of FIG. 3 and IR measurement experiments of Examples, and thus will be described in detail in the IR measurement experiments of Examples given later.

In the present disclosure, a polymer capable of forming a self-assembled polymer as described above may be a polymer composed of a repeating unit represented by formula 1 below:

<Formula 1> wherein,

A is —O—; —NH—; alkyl, aryl, alkylaryl, or arylalkyl of 1-10 carbon atoms; or one selected from the group consisting of cyclic and noncyclic alkylenes, alkenylenes, arylenes, arylalkylenes, and alkylarylenes of 1-20 carbon atoms that are unsubstituted or substituted by a hetero atom selected from the group consisting of N, O, and S;

B is hydrogen, halogen, nitrile, or one selected from the group consisting of alkyl, aryl, alkylaryl, and arylalkyl of 1-20 carbon atoms;

$R_1$ is a bond, or one selected from the group consisting of alkylenes, arylenes, arylalkylenes, and alkylarylenes of 1-20 carbon atoms that are unsubstituted or substituted by a hetero atom selected from the group consisting of N, O and S;

X is selected from the group consisting of —OH, —SH, —COOH, —$CONH_2$, —OCOR, —$OCOCF_3$, —SCOR, —$CH_2SH$, —$CH_2SCN$, —$SH_2SCOCH_3$, —COOR, —$Si(OMe)_3$, —$Si(OEt)_3$, —$SiCl_3$, —COCH=$CH_2$, —OCOCH=$CH_2$, —$CH_2O(PEG)_dOCH_3$, —$CH_2Cl$, —$CH_2OCOCCl_3$ and —CH=$CH_2$ where R is alkyl, aryl, alkylaryl, or arylalkyl of 1-20 carbon atoms, PEG is polyethyleneglycol, d is PEG having a molecular weight of 200 to 10,000, Me is a methyl group, and Et is an ethyl group;

n is 2 to 10,000; and the repeating unit may be a combination of 2 to 10 different repeating units.

More preferably, the polymer constituting the self-assembled polymer is a polymer composed of a repeating unit represented by formula 2 below:

<Formula 2> wherein, $R_2$, $R_3$ and $R_4$ are each independently hydrogen, halogen, nitrile, or one selected from the group consisting of alkyl, aryl, alkylaryl, and arylalkyl of 1-10 carbon atoms that are unsubstituted or substituted by a hetero atom selected from the group consisting of N, O, S, and halogen;

$R_1$ is a bond, or one selected from the group consisting of alkylenes, arylenes, arylalkylenes, and alkylarylenes of 1-20 carbon atoms that are unsubstituted or substituted by a hetero atom selected from the group consisting of N, O and S;

X is selected from the group consisting of —OH, —SH, —COOH, —CONH$_2$, —OCOR, —OCOCF$_3$, —SCOR, —CH$_2$SH, —CH$_2$SCN, —SH$_2$SCOCH$_3$, —COOR, —Si(OMe)$_3$, —Si(OEt)$_3$, —SiCl$_3$, —COCH=CH$_2$, —OCOCH=CH$_2$, —CH$_2$O(PEG)$_d$OCH$_3$, —CH$_2$Cl, —CH$_2$OCOCCl$_3$ and —CH=CH$_2$ where R is alkyl, aryl, alkylaryl, or arylalkyl of 1-20 carbon atoms, PEG is polyethyleneglycol, d is PEG having a molecular weight of 200 to 10,000, Me is a methyl group, and Et is an ethyl group;

n is 2 to 10,000; and the repeating unit may be a combination of 2 to 10 different repeating units.

Most preferably, the polymer constituting the self-assembled polymer is a polymer composed of a repeating unit represented by formula 3 below:

<Formula 3> wherein,

X is selected from the group consisting of —OH, —SH, —COOH, —CONH$_2$, —OCOR, —OCOCF$_3$, —SCOR, —CH$_2$SH, —CH$_2$SCN, —SH$_2$SCOCH$_3$, —COOR, —Si(OMe)$_3$, —Si(OEt)$_3$, —SiCl$_3$, —COCH=CH$_2$, —OCOCH=CH$_2$, —CH$_2$O(PEG)$_d$OCH$_3$, —CH$_2$Cl, —CH$_2$OCOCCl$_3$ and —CH=CH$_2$ where R is alkyl, aryl, alkylaryl, or arylalkyl of 1-20 carbon atoms, PEG is polyethyleneglycol, d is PEG having a molecular weight of 200 to 10,000, Me is a methyl group, and Et is an ethyl group;

n is 2 to 6,000; and the repeating unit may be a combination of 2 to 10 different repeating units.

In addition to the above polymers, a dimer such as 2,2-biphenol, 2,2-methylenebis-4-chlorophenol, and 2,2-methylenebis [6-(2H-benzotriazole-2-yl)-4-(1,1,3,3-tetramethylbutyl)phenol] can also be self-assembled.

In the present disclosure, a self-assembled polymer is formed as a monolayer on a surface of an oxide semiconductor using one of the above-described polymers due to the characteristics of self-assembly. A reactive group of a polymer is preferentially bound to an exposed surface of a semiconductor to form a polymer monolayer. Even though polymer overlapping may occur on the polymer monolayer by a Van der Waals force, such a physical adsorption can be removed by cleaning with a solvent, etc. By doing so, overlapping of an overlapped polymer with a dye can be minimized.

In the present disclosure, a metal oxide semiconductor that can be used as a substrate for polymer self-assembly may be at least one selected from the group consisting of titanium oxide, niobium oxide, nickel oxide, copper oxide, zirconium oxide, hafnium oxide, strontium oxide, zinc oxide, indium oxide, and tin oxide.

More preferably, the metal oxide semiconductor is at least one selected from the group consisting of titanium dioxide ($TiO_2$), tin dioxide ($SnO_2$), niobium pentaoxide ($Nb_2O_5$), and zinc oxide (ZnO).

The metal oxide semiconductor is high transmittance in visible light due to transparency and is stable in photoreaction due to relatively high bandgap.

In the present disclosure, the dye may be at least one transition metal complex selected from the group consisting of $RuL_2(SCN)_2$, $RuL_2(H_2O)_2$, $RuL_3$, $RuL_2$, $OsL_3$, $OsL_2$, and $RuLL'(SCN)_2$ where L and L' are each a ligand. In the transition metal complex, the ligand of the complex may be 2,2'-bipyridyl-4,4'-dicarboxylate but is not limited thereto. The ligand of the complex may be any ligand used in the art.

The dye has similar functions to chlorophyll of a plant that absorbs light energy and transfers electrons to an intermediate in a cell membrane. That is, the dye, when absorbs light, is converted to an excited state. The excited dye transfers electrons to the semiconductor and falls back to the ground state. The dye of the ground state receives electrons from an electrolyte and returns to its original state.

Meanwhile, in the present disclosure, the dye may be a metal or nonmetal phthalocyanine or porphyrin complex. The phthalocyanine complex and the porphyrin complex are known as representative compounds having electron transfer capability.

A dye-sensitized solar cell according to the present disclosure using the above-described semiconductor anode may include a semiconductor anode; an electrolyte solution layer disposed on a lower portion of the semiconductor anode; and an opposite electrode disposed on a lower portion of the electrolyte solution layer.

A dye-sensitized solar cell according to the present disclosure can be manufactured by a common method known in the art.

First, a metal oxide semiconductor electrode which is an anode is prepared. A metal oxide colloid solution is prepared using metal salt and acid by hydrothermal synthesis. A solvent is evaporated from the metal oxide colloid solution until metal oxide in the solution reaches a predetermined concentration to thereby obtain a concentrated metal oxide colloid solution containing metal oxide nanoparticles.

Next, an organic polymer is added to the concentrated metal oxide colloid solution and stirred for 48 hours to make a metal oxide coating slurry. The metal oxide coating slurry is coated on a transparent and conductive glass substrate coated with ITO, FTO (fluorine tin oxide), etc, and having excellent transmittance. Then, the resultant structure is thermally treated at about 500° C. for a predetermined time so that the organic polymer is removed and the metal oxide nanoparticles are contacted and filled with each other. The metal oxide coating slurry may be coated by a doctor blade method or a screen printing method. As a result, a porous metal oxide semiconductor film having a predetermined roughness factor is formed on the transparent and conductive glass substrate to thereby complete a semiconductor electrode.

The roughness factor of the metal oxide semiconductor film is defined by Equation 1 below and is preferably 20 or more:

Roughness factor=real surface area/geometrical surface area  <Equation 1>

The roughness factor is determined by the ratio of the amounts of charges generated from two electrode surfaces that have macroscopically the same surface morphologies but microscopically different surface morphologies, i.e., a rough (real) electrode surface and a smooth (geometrical) electrode surface. In another way, the roughness factor is determined by the ratio of a surface area for actual adsorption and a macroscopically visible surface area. The roughness factor of a rough or porous surface is relatively high.

Next, the semiconductor electrode is dipped in a dye solution for a predetermined time to form a dye on the metal oxide film. Then, the dye-containing semiconductor electrode is dipped in a polymer solution or dispersion for a predetermined time to form a polymer on the metal oxide film.

Finally, the semiconductor electrode and its opposite electrode are assembled. Then, an electrolyte solution is injected between the semiconductor electrode and its opposite electrode and sealed to thereby complete a dye-sensitized solar cell.

In the present disclosure, the electrolyte solution layer disposed on the lower portion of the semiconductor anode may contain at least one chemical species selected from the group consisting of iodide, bromide, and hydroquinone.

The electrolyte solution may be used as a polymer film electrolyte obtained by impregnating a polymer film with an electrolyte or may be a polymer electrolyte. The photovoltage of the dye-sensitized solar cell is determined by a difference between the oxidation-reduction potential of the chemical species and the Fermi level. Thus, it is preferable to use chemical species having more positive oxidation-reduction potential with respect to the standard hydrogen electrode since the photovoltage of the dye-sensitized solar cell increases.

According to an aspect of the present disclosure, there is provided a method of manufacturing a dye-sensitized solar cell, the method including: contacting a metal oxide semiconductor formed on a conductive substrate to a dye solution or dispersion; and contacting the resultant dye-adsorbed semiconductor to a polymer solution or dispersion.

In the operation of contacting the metal oxide semiconductor to the dye solution or dispersion, a dye is adsorbed on the metal oxide semiconductor. As more dyes are adsorbed on the metal oxide semiconductor, more electrons are generated. Thus, it is preferable to adsorb the dye as many as possible on the metal oxide semiconductor. However, due to surface non-uniformity of the metal oxide semiconductor, the dye cannot be adsorbed on the entire surface of the metal oxide semiconductor.

In the operation of contacting the resultant dye-adsorbed semiconductor to the polymer solution or dispersion, a polymer is self-assembled on a surface of the metal oxide semiconductor. The polymer is preferentially attached onto a dye-free surface of the metal oxide semiconductor. When there is no dye-free surface of the metal oxide semiconductor, the polymer is adsorbed onto a surface of the dye or a previously self-assembled polymer. However, such an overlap is a simple physical adsorption and thus can be removed by cleaning with a solvent, etc.

In this respect, the method of manufacturing the dye-sensitized solar cell may further include cleaning the dye- and polymer-adsorbed semiconductor with a solvent, etc. to form a polymer monolayer.

According to another aspect of the present disclosure, there is provided a method of manufacturing a dye-sensitized solar cell, the method including: contacting a metal oxide semiconductor formed on a conductive substrate to a dye solution or dispersion; contacting the dye-adsorbed semiconductor to a monomer solution or dispersion; and polymerizing the monomer incorporated on a surface of the semiconductor.

When a monomer is used instead of a polymer, a polymer can be more uniformly formed on a non-uniform surface of the semiconductor. Furthermore, since the monomer can permeate a very narrow surface portion of the semiconductor, a more efficient self-assembly is ensured.

When monomer self-assembly is accomplished, a polymer is formed by monomer polymerization using an appropriate method. By doing so, more dense and solid film can be obtained. The monomer polymerization may be performed using at least one selected from the group consisting of ultraviolet ray, infrared ray, and heat.

As used herein, the monomer may be a monomer represented by formula 4 below:

<Formula 4> wherein,

Z is selected from the group consisting of —OH, —OCOR, —OCOCF$_3$, —SH, SCOR, —CH$_2$SH, —CH$_2$SCN, —SH$_2$SCOCH$_3$, —COOH, —COOR, —CH$_2$O(PEG)$_d$ OCH$_3$, —CH$_2$Cl, —CH$_2$OCOCCl$_3$, —CH=CH$_2$, and a mixture thereof, and R is alkyl, aryl, alkylaryl, or arylalkyl of 1-20 carbon atoms.

The monomer polymerization may produce a polymer represented by formula 3.

In the two methods, the operation of contacting the dye-adsorbed semiconductor to the monomer or polymer solution or dispersion may also be performed by periodic spraying or painting, in addition to dipping. However, since a prolonged contact time is generally required for self-assembly, dipping is most preferable.

Meanwhile, a specific reactive group-containing polymer composition is self-assembled on a surface of a metal oxide semiconductor of a dye-sensitized solar cell. The polymer may be a polymer represented by formula 1, 2, or 3, or a combination thereof.

Hereinafter, the present disclosure will be described more specifically with reference to the following examples. The following examples are for illustrative purposes and are not intended to limit the scope of the disclosure.

Manufacturing of Semiconductor Anodes

EXAMPLE 1

A titanium dioxide colloid solution was prepared using titanium isopropoxide and acetic acid by hydrothermal synthesis. A solvent was evaporated from the colloid solution until the content of titanium dioxide in the colloid solution reached 10 volume % to thereby obtain a concentrated titanium dioxide colloid solution containing titanium dioxide nanoparticles.

Next, hydroxypropylcellulose (Mw: 80000) was added to the concentrated titanium dioxide colloid solution and stirred for 24 hours to make a titanium dioxide coating slurry.

Next, the titanium dioxide coating slurry was coated on a transparent and conductive glass substrate coated with ITO and having 80% transmittance by a doctor blade method and heated at about 450° C. for one hour to remove an organic polymer and ensure a contact and filling between the titanium dioxide nanoparticles.

As a result, a titanium dioxide nanoparticle film was formed to a thickness of 10 μm on the transparent and conductive glass substrate.

Next, the glass substrate thereon having the titanium dioxide nanoparticle film was dipped in a 0.3 mM ruthenium dithiocyanate 2,2'-bipyridyl-4,4'-dicarboxylate solution for 24 hours and dried to form a dye layer on the titanium dioxide nanoparticle film.

Next, the glass substrate thereon having the dye layer was dipped in a solution of 200 mg of poly(4-vinyl)phenol in 100 mL of an acetonitrile solvent for 10 minutes.

Next, the resultant dye- and polymer-containing glass substrate was cleaned with an acetonitrile solution to thereby complete a semiconductor anode.

Figure 4:
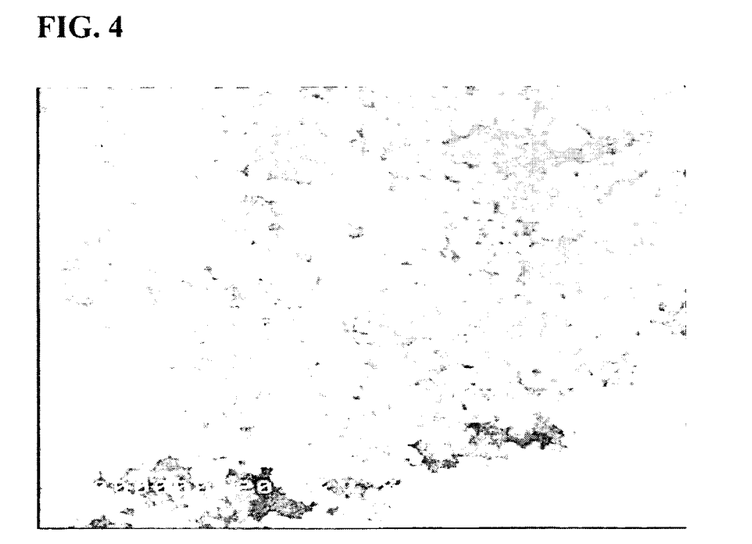
FIG. 4 is a Scanning Electron Microscopic (SEM) image of a semiconductor electrode including a dye and a polymer.
Figure 5:
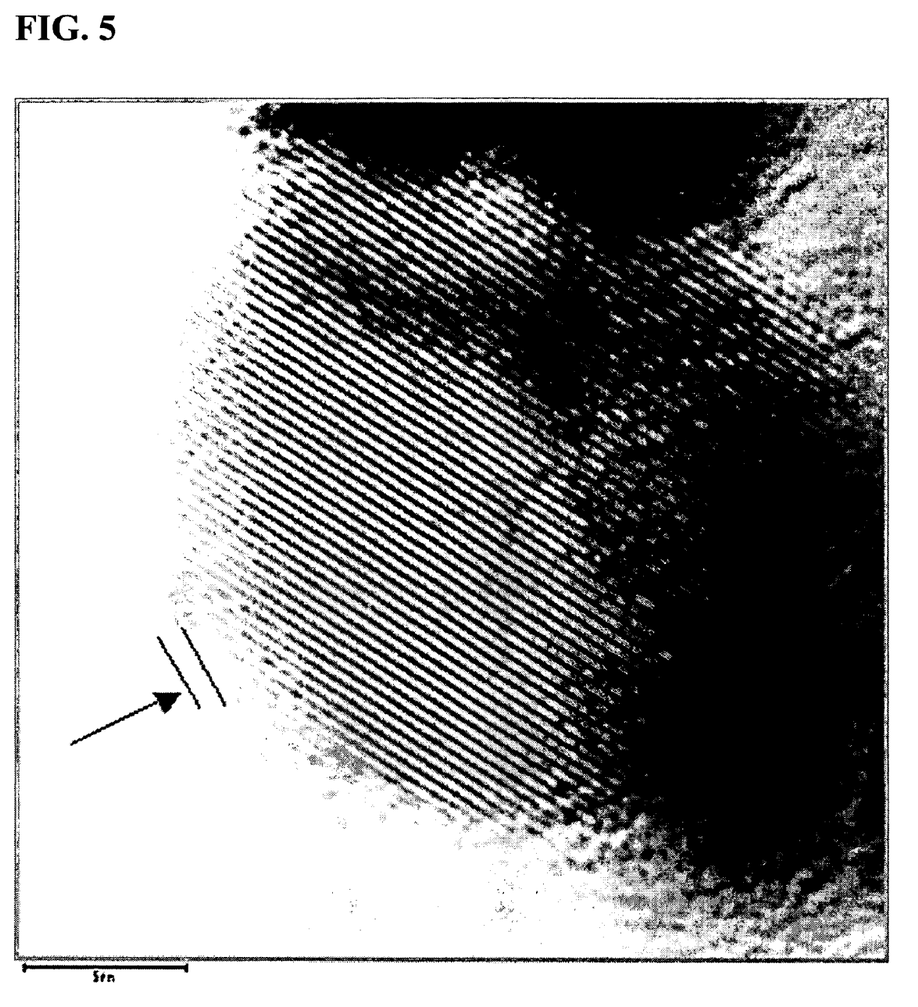
FIG. 5 is a Transmission Electron Microscopic (TEM) image of a semiconductor electrode including a dye and a polymer.

Referring to FIG. 4, the titanium dioxide nanoparticle film has a very uneven and porous surface and thus a relatively large roughness factor, and the titanium dioxide nanoparticles with a particle size of about 40 to 50 nm are connected to each other like a cluster of grapes. FIG. 5 shows that a polymer layer is further formed on a dye layer (see the region represented by arrow in FIG. 5).

COMPARATIVE EXAMPLE 1

A semiconductor anode was manufactured in the same manner as in Example 1 except that only a dye layer was formed on a transparent and conductive substrate.

Figure 6:
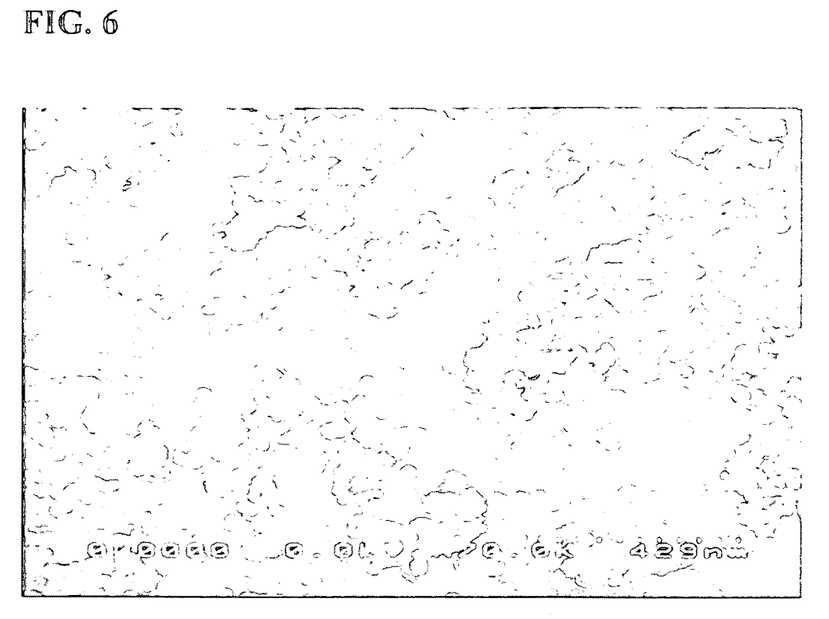
FIG. 6 is a SEM image of a semiconductor electrode including a dye.

Referring to FIG. 6, a very uneven and porous film is observed and nanoparticles with a particle size of about 40 to 50 nm are connected to each other like a cluster of grapes.

COMPARATIVE EXAMPLE 2

A semiconductor anode was manufactured in the same manner as in Example 1 except that only a polymer layer was formed on a transparent and conductive substrate.

Figure 7:
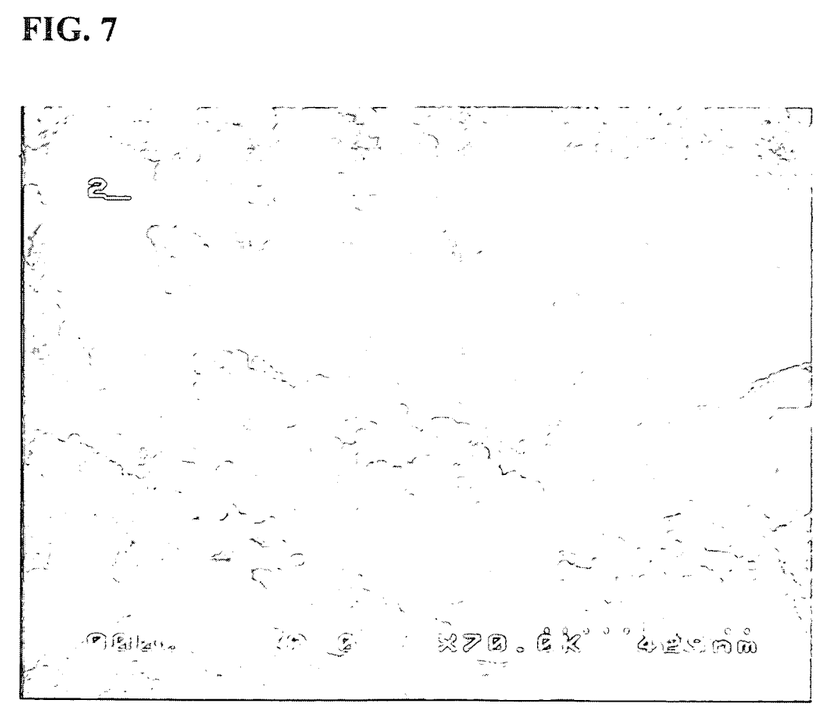
FIG. 7 is a SEM image of a semiconductor electrode including a polymer.
Figure 8:
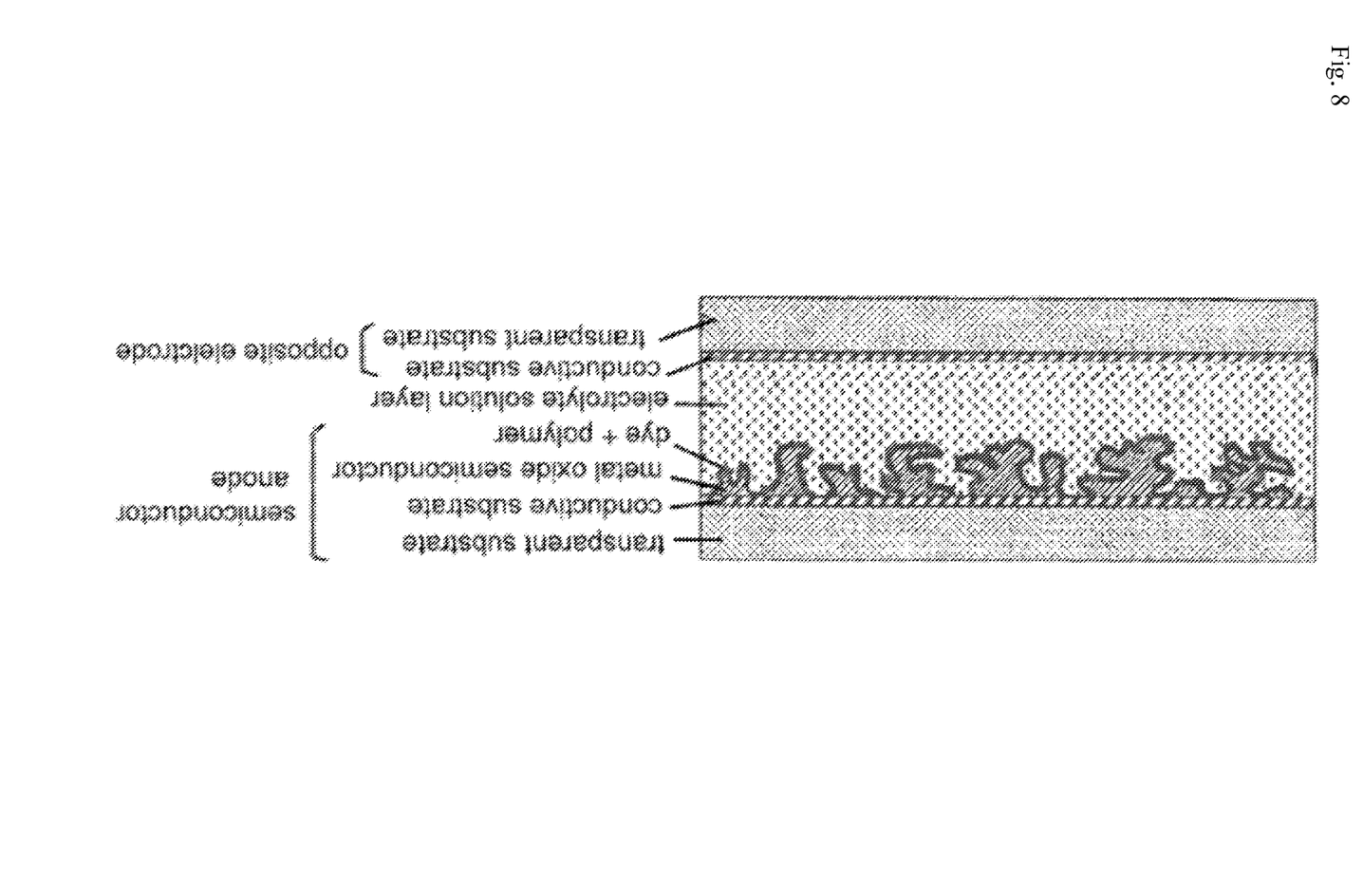
FIG. 8 is a schematic sectional view of a dye-sensitized solar cell according to the present disclosure.

Referring to FIG. 7, a very uneven and porous film is observed and nanoparticles with a particle size of about 40 to 50 nm are connected to each other like a cluster of grapes.

Manufacturing of Solar Cells

An opposite cathode to be coupled to each semiconductor anode manufactured in Examples 1-3 and Comparative Examples 1-2 was manufactured. That is, a platinum layer was coated on a transparent and conductive glass substrate coated with ITO.

Next, the opposite cathode and the semiconductor anode were assembled. The assembling was performed so that the platinum layer of the opposite cathode faced with the semiconductor of the semiconductor anode. At this time, the opposite cathode and the semiconductor anode were closely adhered to each other on about 100-140° C. heating plate by means of a polymer layer made of SURLYN (manufactured by DuPont) having a thickness of about 40 μm as an intermediate layer between the two electrodes under about 1-3 atm.

The SURLYN polymer was adhered to the surfaces of the two electrodes by heat and pressure.

Next, a space defined by the two electrodes was filled with an electrolyte solution through micropores previously formed on the surface of the opposite cathode.

The electrolyte solution was an $I_3^-/I^-$ electrolyte solution obtained by dissolving 0.6M 1,2-dimethyl-3-octyl-imidazolium iodide, 0.2M LiI, 0.04M $I_2$, and 0.2M 4-tert-butylpyridine (TBP) in acetonitrile.

IR Measurement

Polymer-incorporated and/or dye-coated substrates were cleaned with 50 mL of acetonitrile five times and dried in an oven set to 60° C. for two hours. Then, IR spectra for the substrates were measured and the results are shown in FIG. 3.

Figure 3:
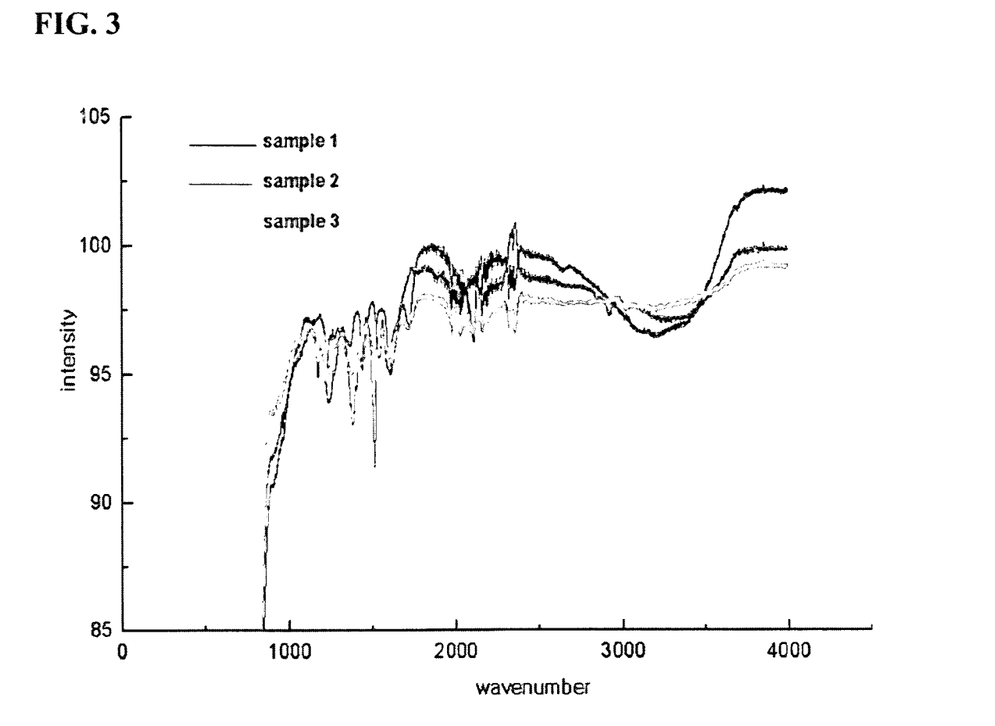
FIG. 3 is IR spectra of three semiconductor electrodes including a dye, a polymer, and a dye/polymer, respectively.

Referring to FIG. 3, the sample 1 is a semiconductor electrode in which only a ruthenium dithiocyanate 2,2'-bipyridyl-4,4'-dicarboxylate dye is formed on a surface of P25 (nanocrystalline titanium oxide, Degussa) (Comparative Example 1). —C=O feature peak and —SCN feature peak are observed each at about 1750 $cm^{-1}$ and 2200 $cm^{-1}$, which shows the presence of a ruthenium complex.

The sample 2 is a semiconductor electrode in which only a poly(4-vinyl)phenol polymer is self-assembled on a surface of P25 (Comparative Example 2). An aliphatic C—H stretching peak is observed at 3000 $cm^{-1}$. However, —C=O feature peak and —SCN feature peak each at about 1750 $cm^{-1}$ and 2200 $cm^{-1}$ showing the presence of the dye, are not observed.

The sample 3 is a semiconductor electrode in which a ruthenium dithiocyanate 2,2'-bipyridyl-4,4'-dicarboxylate dye is formed and then a poly(4-vinyl)phenol polymer is self-assembled on a surface of P25 (Example 1). The —SCN feature peak, the C=O feature peak, and the aliphatic C—H stretching peak are observed, which shows the presence of both the polymer and the dye on the oxide semiconductor.

A polymer may also overlap with a dye. In this case, however, since the binding of the dye and the polymer is based on weak physical adsorption as described above, the overlaps can be removed by cleaning with a solvent, etc.

Energy Conversion Efficiency Evaluation

Current-voltage characteristics of the dye-sensitized solar cells manufactured in Examples 1-3 and Comparative Example 1-2 were evaluated under AM 1.5 conditions (100 mW/cm²). A 1000 W sulfur lamp was used as a light source, and light intensity was adjusted to the AM 1.5 conditions using a silicon solar cell equipped with a KG-5 filter (manufactured by Schott Optical company).

TABLE 1

|  | Example 1 | Example 2 | Example 3 | Comparative Example 1 | Comparative Example 2 |
|---|---|---|---|---|---|
| Efficiency (%) | 3.9 | 3.7 | 3.8 | 3.5 | 0.0 |

As shown in Table 1, the dye-sensitized solar cells manufactured in Examples 1-3 exhibited relatively excellent energy conversion efficiency compared to those manufactured in Comparative Examples 1-2. The enhancement in energy conversion efficiency is attributed to the prevention of electron transfer from a semiconductor to an electrolyte by a polymer.

A dye-sensitized solar cell according to the present disclosure includes an organic material layer-incorporated metal oxide semiconductor. Therefore, the transfer of electrons in the semiconductor to an electrolyte can be prevented, thereby increasing photocurrent and photovoltage, resulting in enhancement in energy conversion efficiency.

The present invention has been described by way of exemplary embodiments to which it is not limited. Variations and modifications will occur to those skilled in the art without departing from the scope of the invention as recited in the claims appended hereto.

What is claimed is:

1. A semiconductor anode comprising:
a metal oxide semiconductor formed on a conductive substrate;
a dye formed on a surface of the metal oxide semiconductor; and
a polymer self-assembled on a dye-free surface of the metal oxide semiconductor, wherein the metal oxide semiconductor is $TiO_2$ and
wherein the polymer comprises a repeating unit represented by formula 1 below:

(1)

wherein,

A is —O—; —NH—; alkyl, aryl, alkylaryl, or arylalkyl of 1-10 carbon atoms; or one selected from the group consisting of cyclic and noncyclic alkylenes, alkenylenes, arylenes, arylalkylenes, and alkylarylenes of 1-20 carbon atoms that are unsubstituted or substituted by a hetero atom selected from the group consisting of N, O, and S;

B is hydrogen, halogen, nitrile, or one selected from the group consisting of alkyl, aryl, alkylaryl, and arylalkyl of 1-20 carbon atoms;

$R_1$ is a bond, or one selected from the group consisting of alkylenes, arylenes, arylalkylenes, and alkylarylenes of 1-20 carbon atoms that are unsubstituted or substituted by a hetero atom selected from the group consisting of N, O and S;

X is selected from the group consisting of —OH, —SH, —COOH, —CONH$_2$, —OCOR, —OCOCF$_3$, —SCOR, —CH$_7$SH, —CH$_2$SCN, —SH$_2$SCOCH$_3$, —COOR, —Si(OMe)$_3$, —Si(OEO$_3$, —COCH=CH$_2$, —OCOCH=CH$_2$, —CH$_2$O(PEG)$_d$OCH$_3$, —CH$_2$Cl, —CH$_2$OCOCCl$_3$, and —CH=CH$_2$ where R is alkyl, aryl, alkylaryl, or arylalkyl of 1-20 carbon atoms, PEG is polyethyleneglycol, d is PEG having a molecular weight of 200 to 10,000, Me is a methyl group, and Et is an ethyl group;

n is 2 to 10,000; and the repeating unit may be a combination of 2 to 10 different repeating units.

2. The semiconductor anode of claim 1, wherein the polymer is a polymer consisting of a repeating unit represented by formula 1 below:

wherein,

A is —O—; —NH—; alkyl, aryl, alkylaryl, or arylalkyl of 1-10 carbon atoms; or one selected from the group consisting of cyclic and noncyclic alkylenes, alkenylenes, arylenes, arylalkylenes, and alkylarylenes of 1-20 carbon atoms that are unsubstituted or substituted by a hetero atom selected from the group consisting of N, O, and S;

B is hydrogen, halogen, nitrile, or one selected from the group consisting of alkyl, aryl, alkylaryl, and arylalkyl of 1-20 carbon atoms;

$R_1$ is a bond, or one selected from the group consisting of alkylenes, arylenes, arylalkylenes, and alkylarylenes of 1-20 carbon atoms that are unsubstituted or substituted by a hetero atom selected from the group consisting of N, O and S;

X is selected from the group consisting of —OH, —SH, —COON, —CONH$_2$, —OCOR, —OCOCF$_3$, —SCOR, —CH$_2$SH, —CH$_2$SCN, —SH$_2$SCOCH$_3$, —COOR, —Si(OMe)$_3$, —Si(OEt)$_3$, —SiCl$_3$, —COCH=CH$_2$, —OCOCH=CH$_2$, —CH$_2$O(PEG)$_d$OCH$_3$, —CH$_2$Cl, —CH$_2$OCOCCl$_3$, and —CH=CH$_2$ where R is alkyl, aryl, alkylaryl, or arylalkyl of 1-20 carbon atoms, PEG is polyethyleneglycol, d is PEG having a molecular weight of 200 to 10,000, Me is a methyl group, and Et is an ethyl group;

n is 2 to 10,000; and the repeating unit may be a combination of 2 to 10 different repeating units.

3. The semiconductor anode of claim 1, wherein the dye is at least one transition metal complex selected from the group consisting of $RuL_2(SCN)_2$, $RuL_2(H_2O)_2$, $RuL_3$, $RuL_2$, $OsL_3$, $OsL_2$, and RuLL (SCN)$_2$.

4. A dye-sensitized solar cell comprising:
the semiconductor anode of claim 1;
an electrolyte solution layer formed on a lower portion of the semiconductor anode; and
an opposite electrode formed on a lower portion of the electrolyte solution layer.

5. The dye-sensitized solar cell of claim 4, wherein the electrolyte solution layer comprises at least one chemical species selected from the group consisting of iodide, bromide, and hydroquinone.

* * * * *